July 1, 1924.  1,499,852
P. V. CERINI
APPARATUS FOR FOOD PREPARATION
Original Filed Dec. 1, 1922
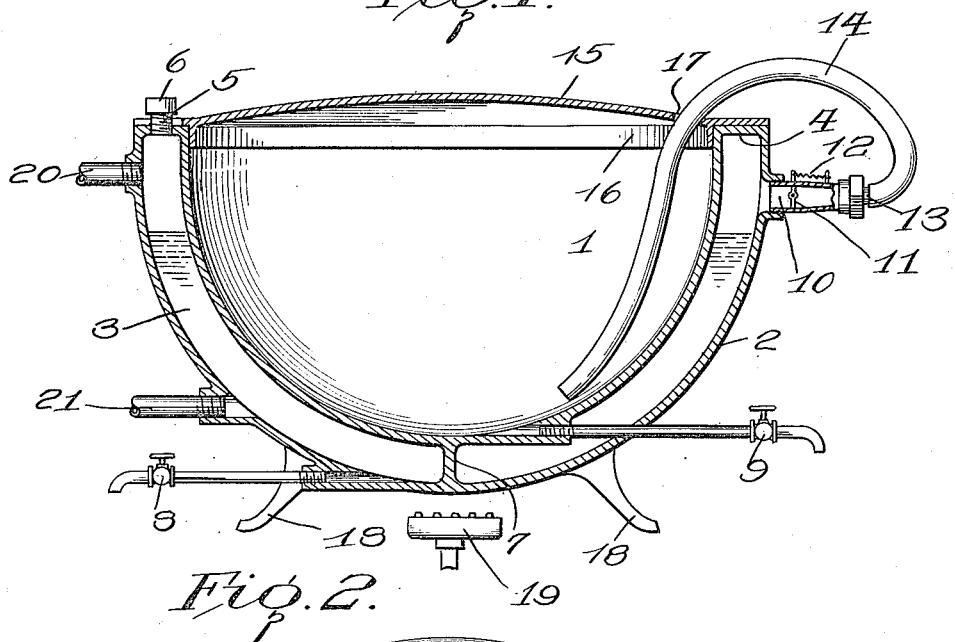
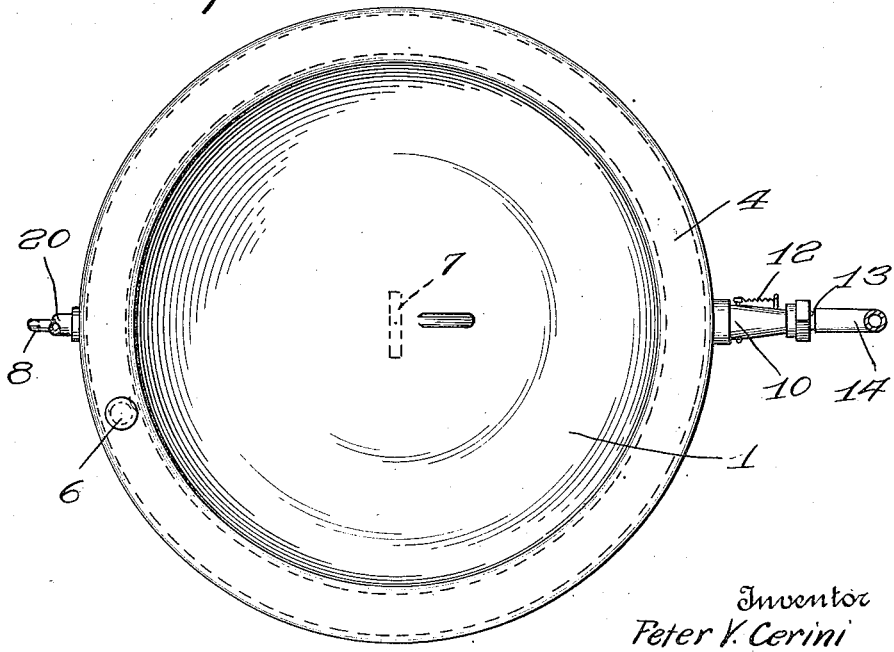
Inventor
Peter V. Cerini
Attorney Patented July 1, 1924.

1,499,852

UNITED STATES PATENT OFFICE.

PETER V. CERINI, OF MONROE, WASHINGTON.

APPARATUS FOR FOOD PREPARATION.

Application filed December 1, 1922, Serial No. 604,446. Renewed March 22, 1924.

*To all whom it may concern:*

Be it known that PETER VALENTINO CERINI, citizen of the United States, residing at Monroe, in the county of Snohomish and State of Washington, has invented certain new and useful Improvements in Apparatus for Food Preparation, of which the following is a specification.

This invention relates to a means for preparing food, and more particularly food intended for cattle and the like, in the use of which the food will be properly prepared with no liability of being over cooked, scorched, or burned, and this without particular attention while cooking.

It is well understood that raw food when eaten by cattle, particularly milk cows, has a tendency to ferment and produce an acid condition which unfavorably affects the milk, to say nothing of the ultimate effect upon the general health and well being of the animal. Cooked food while generally of decided advantage over raw food must, in order to avoid deleterious effects on an animal and milk, be cooked in such a manner that while it is thoroughly cooked, it is not over cooked, scorched, or under cooked. Methods heretofore proposed for preparing food for milk cows, have required the constant attention of the attendant and the practically constant agitation of the food to prevent scorching and insure cooking to the proper degree, and this of course materially adds to the cost of the feeding of an animal.

The present invention is directed to a means by which the food may be cooked to the proper or any desired degree without liability of scorching and without any attention whatever during the cooking operation.

In the drawings:

Fig. 1 is a vertical sectional view through the cooker.

Fig. 2 is a top plan view thereof, the cover being removed.

In the drawings, the cooking vessel is shown as involving a double wall container, the inner or food receiving vessel 1 having an outer relatively spaced wall 2, providing a space 3 between the walls, the upper edge of which is more or less permanently closed by a flange 4, bridging the space between the free edges of the wall, this space being formed with a filling opening 5 adapted to be closed by a plug 6. The wall 1 of the inner vessel may, if desired, be braced from the wall 2 by interior braces 7, one of which is shown. The space 3 is provided with a valve outlet 8, by which said space may be drained from time to time for cleaning; and the interior vessel 1 has a valve outlet 9 for similar purposes.

The space 3 is provided with an outlet 10 near the upper end thereof, in which is arranged a check valve 11, opening under pressure from the space and held in closed relation under an adjusting means 12, whereby the opening pressure of the valve may be regulated at will. The valve is conventionally shown and any type of adjustable pressure opening valve may be utilized. The terminal of the outlet 10 is formed for the reception of a hose end 13, the flexible hose extension 14 of which is of sufficient length to reach to the interior of the vessel 1.

The vessel 1 is preferably provided with a cover 15 having a flange 16, whereby the vessel may be closed, this cover having an opening 17 for the passage of the hose 14 therethrough. The outer wall or vessel 2 is preferably provided with legs 18, whereby the cooker as an entirety may be supported above a burner or other source of heat 19.

The food to be cooked mixed with the proper quantity of water is placed in the vessel 1 and the space 3 substantially filled with water through the opening 5. In the application of the heat, the contents of the vessel 1 are heated by the heat of the water in the space 3, and when the steam generated from this hose reaches a certain predetermined pressure, it will open the valve 11 and through the medium of the hose 14 be directed to the interior of the vessel 1 or within the food being cooked. This insures an even distribution of the cooking heat to the food in contact with the wall of vessel 1, and also interiorly of the mass of food, the steam passing through the pipe 14 acting as a gentle agitating means to keep the food in more or less circulation for a better cooking effect.

It is of course to be understood that the valve 11 is set to open at that pressure corresponding to the desired heat for the interior of the food, so that when the water reaches a degree of heat which will produce the required pressure of steam, said steam pressure will open the valve and the steam will be admitted to the interior of the vessel 1.

In the use of larger cookers as for dairy barns having a number of cattle, the space 3, when the device is not in use as a cooker, may be made to serve as a heating means to some extent for the barn. For this purpose, there is shown the terminals of circulating pipes 20 and 21, by which the cooker may serve as a heater for the water of circulation, as will be obvious.

Claim:

A cooker, including a double boiler, an outlet from the space between the walls of the boiler, a valve controlling the outlet adapted to open under predetermined pressure, a removable cover for the inner boiler having an opening formed therein near one side, and a flexible hose secured to the outlet and extending through the opening in the cover into the inner boiler, whereby the valve controls the steam passing into the inner boiler, and the cover serves to remove the hose from the inner boiler therewith.

In testimony whereof I affix my signature.

PETER V. CERINI.